United States Patent [19]

Hutchins et al.

[11] Patent Number: 4,656,226

[45] Date of Patent: Apr. 7, 1987

[54] ACRYLIC PIGMENT DISPERSANTS MADE BY GROUP TRANSFER POLYMERIZATION

[75] Inventors: Clyde S. Hutchins, Arlington, Tenn.; Arthur C. Shor, West Chester, Pa.

[73] Assignee: E. I. Du Pont de Nemours and Company, Wilmington, Del.

[21] Appl. No.: 782,257

[22] Filed: Sep. 30, 1985

[51] Int. Cl.$^4$ .............................................. C08L 53/00
[52] U.S. Cl. ......................................... 525/93; 525/94
[58] Field of Search ................................... 525/93, 94

[56] References Cited

U.S. PATENT DOCUMENTS

| | | | |
|---|---|---|---|
| 3,433,753 | 3/1969 | Farkas et al. | 524/523 |
| 4,388,448 | 6/1983 | Melby | 526/215 |
| 4,414,372 | 11/1983 | Farnham et al. | 526/194 |
| 4,417,034 | 11/1983 | Webster | 526/190 |
| 4,508,880 | 4/1985 | Webster | 526/190 |
| 4,524,196 | 6/1985 | Farnham et al. | 526/194 |
| 4,588,795 | 5/1986 | Dicker et al. | |

FOREIGN PATENT DOCUMENTS 1108261  4/1968  United Kingdom.

OTHER PUBLICATIONS

F. Banderman et al., "Group Transfer Polymerization of Methyl Methacrylate, (1985) Makromol. Chem., Rapid Commun. 6, 335–339.

J. Suenaga et al., "Polymerization of (RS)–and (R)–o–Methylene–o–Methyl–o–Butyrolactone", (1984) Macromolecular 17, 2913–2916.

R. Asami et al., "Synthesis of Poly(Methyl Methacrylate) Macromer by Group Transfer Polymerization and Polymerization of the Macromer by (1986), Polymer Preprints 27, No. 1, 1186–1187.

Chapter 20 of Organosilicon and Bioorgano—Silicon Chemistry—Sakurai, ed. (1985), Sogah et al., "Group Transfer Polymerization Mechanistic Studies", 219–230.

W. Hertler "New Initiators for Group Transfer Polymerization", (1986) Polymer Preprints 27, No. 1, 165–166.

O. W. Webster, "Group Transfer Polymerization—an Overview", (1986), Polymer Preprints 27, No. 1, 161–162.

F. Banderman et al., "Group Transfer Polymerization of Methyl Methacrylate", (1986) Polymer Preprints 27 No. 1, 1169–1170.

O. W. Webster et al., "Group Transfer Polymerization, 1, a New Concept for Addition Polymerization with Organosilicon Initiators", (1983), J. Am. Chem. Soc. 105, 5706–5708.

D. Y. Sogah et al., "Polymer Architecture Contract in Group Transfer Polymerization", (1984), Polymer Preprints 25, No. 2, 3–4.

*Primary Examiner*—Joseph L. Schofer
*Assistant Examiner*—N. Sarafim

[57] ABSTRACT

A pigment dispersant comprising an AB block copolymer preferably of polymethyl methacrylate and glycidyl methacrylate made by group transfer polymerization, reacted with polar groups, preferably 4-nitrobenzoic acid.

12 Claims, No Drawings

ACRYLIC PIGMENT DISPERSANTS MADE BY GROUP TRANSFER POLYMERIZATION

BACKGROUND OF THE INVENTION

This invention concerns a pigment dispersant, more particularly, it concerns such a dispersant in which the backbone is made by group transfer polymerization processes.

AB dispersants are known having typically a polar group known as the A segment on one end to facilitate attachment to a pigment surface, and a non-polar polymeric or oligomeric group known as the B segment on the other end to enhance steric stabilization of the pigment particles in a dispersion. See U.S. Pat. Nos. 4,032,698 disclosing acrylics with substituted urea end groups; 4,029,861 on polyesters with poly carboxylic acid end groups and 3,788,996; 4,035,557; 4,048,207; and 4,070,388.

British Pat. No. 1,108,261 (1963) and counterpart U.S. Pat. No. 3,433,753 (1969) teach using free radical techniques to prepare dispersant compositions with randomly repeating AB groups including polymers with a backbone of methyl methacrylate (MMA) and glycidyl methacrylate (GMA), with pendant groups of p-nitrobenzoic acid reacted with, for instance 12% (Example 1 of the British Patent) or 90% (Example 10) of the epoxy groups. The backbone is a random copolymer with a molecular weight of about 80,000. Solvents used were polar methyl isobutyl ketone (MIBK) and much larger proportions of non-polar toluene. Such dispersants are useful, but to obtain such high molecular weights, little if any chain transfer agents are used. This results in a large polydispersity of sizes and degree of functionality of the backbone portion. The low proportion of epoxy groups reacted with polar groups can give shelf stability problems and contributes to flocculation. Also, such large polymers tend to provide random large loops sticking out from the pigment surface between the polar group points of attachment. This is a less efficient way to obtain steric stabilization of a pigment dispersion than if the B segments were shorter and of more uniform size, as in a simple AB dispersant without repeating AB sequences. U.S. Pat. No. 4,388,448—Melby discusses low temperature anionic polymerization to make epoxy block copolymers.

Group transfer polymerization (GTP) is a known and established method of acrylic polymerization in which an initiator splits with one end going to the tail of an acrylic monomer unit and the other to the head. The group at the head transfers to the head of a second monomer unit as that unit is polymerized with the first. Such techniques are described at length in various U.S. patents.

O. W. Webster, U.S. Pat. Nos. 4,417,034 (Nov. 22, 1983) and 4,508,880 (Apr. 2, 1985), and W. B. Farnham and D. Y. Sogah, U.S. Pat. Nos. 4,414,372 (Nov. 8, 1983) and 4,524,196 (June 18, 1985) showed that acrylic-epoxy polymers can be prepared via group transfer polymerization. GTP techniques have also been described in the independent scientific literature including F. Bandermann and H. Speikamp (of the Institute für Technische Chemie, Universität-Gesamthochschuls Essen) "Group Transfer Polymerization of Methyl Methacrylate" Makromol. Chem., Rapid Commun. 6, 335-339 (1985). Oxyanion catalysts for GTP processes are described in U.S. application Ser. No. 707,193 Dicker et al., filed Mar. 1, 1985, now U.S. Pat. No. 4,588,795. However, the prior GTP patents, application and literature apparently do not suggest ways to improve known AB dispersants. Catalyst life enhancement can be obtained using the teachings of U.S. application Ser. Nos. 707,192 and 707,194—both Dicker et al., filed Mar. 1, 1985, both abandoned.

The above-identified patents and the application on AB dispersants and GTP processes are hereby incorporated herein by reference.

SUMMARY OF THE INVENTION

The present invention provides a composition suitable for use as an AB dispersant, comprising an A segment and a B segment bonded together to form a block copolymer, the A segment consisting essentially of polymerized methacrylic monomer units and the B segment consisting essentially of polymerized monomer units selected from the group consisting of acrylic and methacrylic groups, the monomer units of said A segment, when homopolymerized, having a polarity which is higher than the polarity of the monomer units of said B segment when homopolymerized, said A segment being bonded to one or more polar groups selected from the group consisting of aromatic carboxylic acids, aliphatic carboxylic acids which have at least one functional group which increases the polarity of the reaction product of the A segment with the aliphatic carboxylic acid, ammonia and primary, secondary and tertiary aliphatic amines, primary aromatic amines, ketones which are subsequently hydrolyzed, orthophosphoric acid, phosphorus pentoxide, and anhydrous hydrohalogen acids, wherein said block copolymer is made by group transfer polymerization techniques.

Preferably the block copolymer is a block copolymer of MMA and GMA, and the polar group reacted with the A segment is 4-nitrobenzoic acid. Most dispersants of the invention work best when dissolved in solvents having a polar solubility coefficient greater than 1.0, such as MIBK, methyl ethyl ketone (MEK), butyl acetate, or acetone. In blends of solvents, of course it is the average polar solubility coefficient that is important.

DETAILED DESCRIPTION

GTP techniques can be used to produce an acrylic block copolymer of low molecular weight, generally between 1500 and 20,000 $M_n$, with regularly-spaced epoxy groups, permitting the facile introduction of a variety of polar groups with a broad range of Lewis acid-base characteristics. The invention also permits the production of more precisely controlled low molecular weight A–B dispersants with less residual unreacted intermediates. Also, this can be done without cryogenic techniques used in anionic polymerization. Stabilization by short chain block copolymers can be superior to stabilization by loops and tails of long chain random copolymers, partly because of greater ease of design control in planning and preparing the dispersant.

Idealized A–B dispersants are block copolymers consisting of a relatively highly polar anchoring A-segment and a relatively non-polar stabilizing B-segment. The A-segment is designed to adsorb on the surface of a pigment by acid-base interaction; the B-segment provides a steric stabilization of the pigment particle against flocculation. The A-segment must be: (1) available for interaction with the pigment surface; (2) of sufficient size to provide irreversible adsorption; and (3) not so large as to completely cover the pigment surface or cause collapse of the B-segment. The B-segment must be: (1) of sufficient sized to provide steric stabilization (approximately $M_n = 1,500$ or larger); and (2) compatible (soluble) with the dispersion media (solvent) and matrix polymer (controlled by B-segment composition). This discussion applies to dispersions in non-polar liquid media such as organic solvents. For dispersion in polar media such as water, the purpose and role of the A and B segments reverses, with the non-polar B-segment attaching to a suitable pigment and the polar A-segment acting as the stabilizer in water.

Solvation of both A and B-segments of a GTP dispersant is often important to effective pigment stabilization. In general, highly aggregated systems require polar solvents to break up or loosen aggregates and allow adsorption of A-segments to pigment surfaces. However, in some cases polar solvents may not be good solvents for extension of the B-segment. Fully extended B-segments are required for optimum steric stabilization. Non-polar solvents (e.g., xylene and toluene) provide B-segment extension but are unable to effectively solvate the A-segment. Consequently, poor dispersions are obtained in these solvents due to the lack of A-segment adsorption. Polar solvents (e.g., acetone) are good A-segment solvents but may not be effective for the extension of certain B-segments. As a result, poor dispersions may be obtained because of the collapse of the stabilizing B-segment or because of too high solubility of the B segment. For the dispersant structures which we have investigated, moderately polar solvents (e.g., MIBK) provide the best dispersions because they solvate both A and B segments. This allows for adsorption (A-segment) on the pigment surface and extension of the B-segment (steric stabilization).

Unreacted epoxy groups in the dispersant molecule may have negative effects on dispersant performance. Acceptable dispersants of nominal epoxy $D_p$-4 have a minimum of three epoxy groups esterified leaving only one epoxy group unreacted. A highspot esterification experiment where about half of the epoxy groups of a nominal $D_p$-7 block copolymer were esterified (with good conversion of the acid) behaved poorly as a dispersant. Apparently, the residual epoxy groups (about 3 per chain) caused the pigment dispersion to flocculate. This dispersant was prepared using preferred esterification conditions at a nitro-functionality of $D_p$(3.8) which would have ordinarily given a good dispersant. We have previously observed that totally unfunctionalized epoxy block copolymers act as pigment flocculating agents.

As used herein, $D_p$ means degree of polymerization, indicating the number of monomer units in the segment, e.g., epoxy groups with acrylic epoxy block copolymer backbone and MMA groups in the B-segment.

The level of amine catalyst in the nitrofunctionalization of epoxy block prepolymers is an important variable in processes of the invention. The preferred procedure involves:
- the preparation of epoxy block prepolymer in polar solvents (glyme) with low levels of GTP catalyst (tetrabutylammonium chlorobenzoate—½% on initiator).
- addition of toluene/MIBK solvents and p-nitrobenzoic acid (no external amine catalyst is added)
- the mixture is heated to reflux and glyme removed by distillation,
- the reaction is held at reflux for about four hours; progress is monitored by acid number.

In the following tests, when a control AB dispersant is used it was made as follows: The B-segment is a copolymer of 58% MMA, and 2% 2-ethyl hexylacrylate (2EHA), polymerized with a "Vazo" 64 polymerization initiator of azobisisobutyronitrile made by E. I. du Pont de Nemours and Company and mercaptoethanol chain transfer agent, to a $M_n$ of 4,500 and an $M_w$ of 9,000. This B-segment is reacted with equimolar amounts of an isocyanate trimer (Desmodur N from Bayer) and double that molar concentration of ammonia.

In the preparation of the backbone acrylic-epoxy copolymers of the invention, "group transfer" polymerization processes are used. By "group transfer" polymerization, is meant a polymerization process in which polymerization of monomers having carbon-carbon double bonds is initiated by certain initiators of the formula Q—Z where Z is an activating substituent that becomes attached to one end of the growing polymer molecule and where Q is a group that continuously transfers to the other end of the growing polymer molecule as more monomer is added to the growing polymer molecule. Thus, polymerization of the monomer,

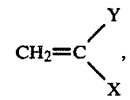

initiated by a group transfer initiator, Q—Z, proceeds as follows:

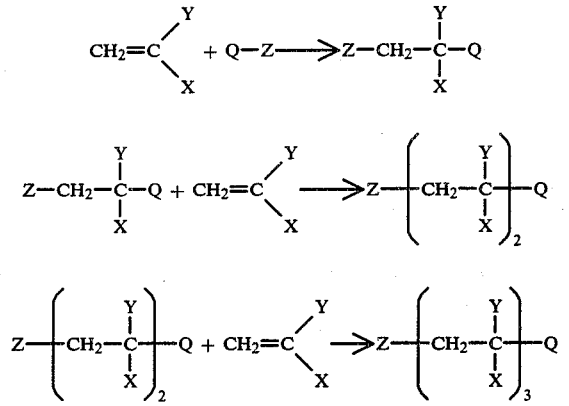

The group, Q, is thus an active site that can initiate further polymerization of more monomer. The polymer molecule having the group, Q, is referred to as a "living" polymer and the group, Q, is referred to as a "living" group transfer initiating site.

The word "living" is sometimes used herein in quotation marks to indicate its special meaning and to distinguish it from substances which are alive in a biological sense.

More particularly, in the preparation of the star polymers, use is made of the "group transfer" polymerization process of the general type described in part by W. B. Farnham and D. Y. Sogah, U.S. Pat. No. 4,414,372 and by O. W. Webster, U.S. Pat. No. 4,417,034, and in continuation-in-part U.S. Pat. Nos. 4,508,880 Webster, granted Apr. 2, 1985, and 4,524,196 Farnham and Sogah, granted June 18, 1985, the disclosures of all of which are incorporated herein by reference. Group transfer polymerization produces a "living polymer" when an initiator of the formula (R¹)₃MZ is used to initiate polymerization of a monomer having a carbon-carbon double bond.

In the initiator, (R¹)₃MZ, the Z group is an activating substituent that becomes attached to one end of the "living" polymer molecule. The (R¹)₃M group becomes attached to the other ("living") end of the "living" polymer molecule. The resulting "living" polymer molecule can then itself act as an initiator for polymerization of the same or a different monomer to produce a new "living" polymer molecule having the Z activating substituent at one end and the (R¹)₃M group at the other ("living") end. The "living" polymer may then be deactivated, if desired, by contacting it with an active proton source such as an alcohol. At this point, it might be useful to consider a specific example—the group transfer polymerization of a specific monomer (in this case, methyl methacrylate) using a specific group transfer initiator (in this case 1-trimethylsiloxy-1-isobutoxy-2-methylpropene). The reaction of 1 mole of initiator with n moles of monomer produces "living" polymer as follows:

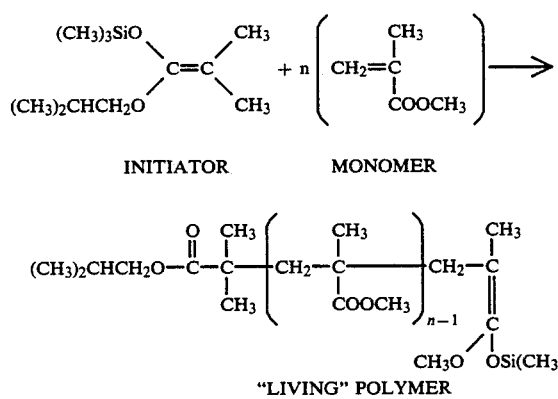

INITIATOR      MONOMER

"LIVING" POLYMER

The

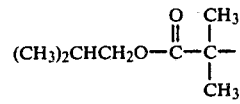

group shown on the left side of the "living" polymer molecule is derived from the activating group, Z, which, in the initiator, was in the form

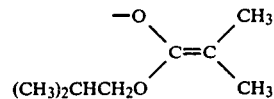

The —Si(CH₃)₃ group on the right side ("living" end) of the "living" polymer molecule is the (R¹)₃M group. The "living" polymer molecule can act as an initiator to initiate polymerization of the same or a different monomer. Thus, if the above "living" polymer is contacted with m moles of butyl methacrylate in the presence of active catalyst, the following "living" polymer is obtained:

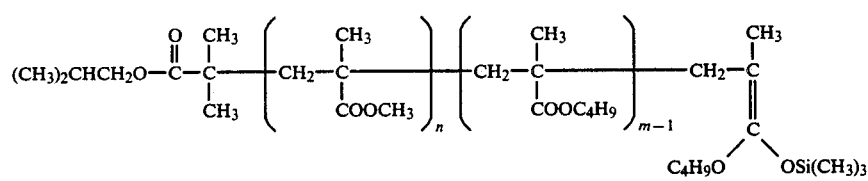

If the resulting "living" polymer is then contacted with methanol, the following deactivated polymer is obtained.

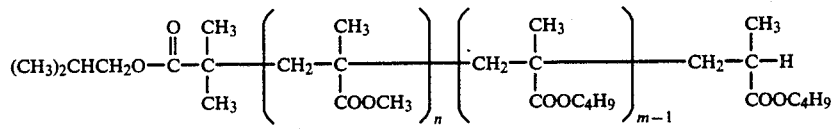

Preferably, group transfer polymerization procedures used in this invention involve a catalyst and an initiator and optionally a polymerization life enhancer. The preferred process involves contacting under polymerization conditions at least one polar monomer with (i) a polymerization initiator compound comprising a tetracoordinate metal selected from Si, Ge and Sn having at least one activating substituent or activating diradical attached thereto and optionally having one or more substituents that are inert under polymerizing conditions, (ii) a catalyst which is a salt comprising an oxyanion whose conjugate acid has a pKa (DMSO) of about 5 to about 24, and a suitable cation, and (iii) a polymerization life enhancement agent which retards the availability of said catalyst during polymerization so as to enhance the duration of "livingness" of the polymerization by increasing the proportion of polymerization events to termination events. Optionally, the catalyst can be a source of fluoride, bifluoride, cyanide, or azide ions or a suitable Lewis acid, and mercaptoethanol chain transfer agent with an $M_n$ of 4,500 and $M_w$ of 9,000.

Dispersant quality is measured by sand grinding a mixture of pigment, solvent and dispersant and determining what proportion of dispersant (if any) will give a uniform dispersion, appearing like stained glass at an optical magnification of 250x. In contrast, flocculated pigment has islands of color interspersed with areas of relatively clear solvent. An arbitrary scale of 1 to 4 describes the degree of dispersion as follows 1 = deflocculated dispersion; pigment particles are uniformly separated; brownian motion of particles is evident.

2 = slightly flocculated dispersion; pigment particles are separated but immobile (no significant evidence of brownian motion).

3 = flocculated dispersions; pigment particles are loosely aggregated with some voids between aggregates 4 = severely flocculated dispersions; pigment particles are highly aggregated with large voids between aggregates.

Each of the examples gave deflocculated dispersions, level 1.

In the examples and elsewhere, parts, percentages and proportions are by weight, and the pigment used in the test was phthalocyanine blue, except where indicated otherwise.

EXAMPLE 1

Preparation of MMA/BMA//GMA ($D_p$-40//$D_p$-4)

All monomers and solvents were dried by passing over 4A molecular sieves. A 250 mL round bottom 4-necked flask equipped with condenser, thermoprobe, $N_2$ inlet, mechanical stirrer and was charge with 44.1 g glyme, 1.68 g of 1-trimethylsiloxy-1-isobutoxy-2-methyl propene, and 66 microliter of a 1M solution of tetrabutyl ammonium m-chlorobenzoate in acetonitrile. A feed containing 33 microliter of 1M tetrabutyl ammonium m-chlorobenzoate in acetonitrile diluted into 0.2 mL of glyme was added over 90 minutes. Concurrently a second feed containing MMA (13.2 g) and BMA (18.8 g) was added over 30 minutes. The temperature rose to 54.4° C. After completion of the 30 minute feed, the batch was cooled to 5° C. and GMA (3.74 g, was added over 2 minutes. The reaction mixture was kept at <10° C. until feed 1 was completed. Xylene (0.1 g) and methanol (1.1 g) were added over 15 minutes. $M_n$=6630, d=1.16 Theoretical $M_n$=5400 solids=43.8% Epoxy titration=0.32 meq/g solution.

EXAMPLE 2

Reaction of MMA/BMA//GMA ($D_p$-40//$D_p$-4) with 4-Nitrobenzoic Acid

One half of the resin solution produced in Example 1 was used in this preparation. Toluene (9.91 g) and methyl isobutyl ketone (6.61 g) were added to the resin solution followed by 1.76 g of p-nitrobenzoic acid. The batch was heated to reflux and 16.5 g of glyme were distilled off. The batch was then held at 101° C. for 6 hours. Acid number=0.75, $M_n$=7080, d=1.13 solids=61.3%.

EXAMPLE 3

Preparation of A 87//13 MMA//GMA Block Polymer

Glyme (473 g), 1-trimethylsiloxy-1-isobutoxy-2-methyl propene (22.8 g) and tetrabutyl ammonium m-chlorobenzoate (0.55 cc of a 1 molal solution in acetonitrile) were added to a 2 liter round bottom 4-necked flask equipped with condenser, temperature probe, and glass paddle stirrer. MMA (448 g) and tetrabutyl ammonium m-chlorobenzoate (2 cc of a 1 molal solution in acetonitrile diluted into 27 g of glyme) were fed over 90 minutes. After completion of the feed (peak temperature=86.3° C.) the batch was cooled externally with an ice bath to 30° C. GMA (61 g) was added batchwise via a dropping funnel over a period of 15 seconds. No exotherm was noted. The ice bath was removed and the temperature was held at 30° C. for 1 hour. Methanol (52 g) was then added to quench the polymerization.

The polymer was precipitated from hexane and dried overnight in a 120° F. oven at atmospheric pressure.

Molecular weight by GPC $M_n$=4170
Theoretical $M_n$=5091

EXAMPLE 4

Reaction of MMA//GMA 87//13) With 4-Nitrobenzoic Acid

Solid polymer (415 g) from Example 3 was dissolved in 622.5 g of 62/38 toluene/methyl isobutyl ketone to yield a 40% polymer solution. This solution (1037.5 g) was charged to a 2 liter round bottom 4-necked flask equipped with condenser, temperature probe, glass paddle stirrer and heating mantle. 4-Nitrobenzoic acid (52.6 g) and N-N-dimethyl dodecyl amine (0.8 g) were charged to the flask and the reaction was brought to reflux (109.6° C.). Refluxing was continued for 18 hours. The resultant product was amber in color. Acid number was determined by titration with 0.087N KOH.

Theoretical acid no (no reaction) = 38
Theoretical aid no (100% reaction) = 0
Titrated acid no = 5.9
Theoretical weight solids = 40.6%
Observed solids = 40.9%

EXAMPLE 5

Preparation of MMA//GMA 87//13 Block Copolymer

A 250 mL four neck roundbottom flask was equipped with septa, thermoprobe and glass paddle stirrer. Flask was then evacuated and dried with heat gun. After filling the flask with nitrogen, glyme (95.5 g) and dimethylketene isobutyl trimethylsilylacetal (2.4 g, 11.1 m moles) were added by syringe. To this mixture a catalyst solution (0.05 cc, 1 m cesium bifluoride in acetonitrile) was also added by syringe. A catalyst feed (0.22 cc, 1 m cesium bifluoride in acetonitrile, in 3 cc glyme) and an MMA monomer feed (40.0 g, 0.4 m) were added simultaneously by syringe pump. During the MMA feed a maximum temperature of 54.2° C. was observed (feed started at 23.9° C.). After completing the MMA feed (45 min) batch was cooled to 2.5° C. with ice bath and 6.0 g (0.42 m) of GMA was then added all at once by dropping funnel. Batch temperature increased to 12° C. after GMA addition (exotherm) and then cooled to 6° C. after a few minutes. Catalyst feed solution was maintained for an additional 15 min. (100 min total feed time). Batch was stirred an additional 90 min. with ice bath removed and quenched with 5.0 g of methanol.

| Analytic Results | |
|---|---|
| Residual Monomer: | GMA - less than 1% |
|  | MMA - less than 1% |
| by high pressure liquid chromatography (HPLC) | |
| GPC mol. wt. | $M_n$ 4770 calculated 4180 |
|  | Pd 1.3 |
| Epoxy $D_p$ (by titration) = | 3.0 (by titration = 3.8) |

EXAMPLE 6

Lab Preparation of a Nitrofunctional MMA Block Copolymer

The MMA//GMA 87//113 (by wt.) epoxy block copolymer from Example 5 was esterified with 4-nitrobenzoic acid to give pendant aromatic nitrofunctionality. After precipitation in hexane and drying, 35.4 g (0.25 equiv. epoxy) of the polymer was dissolved in 53.6 g of toluene/MIBK (60/40 by wt.) and charged to a 300 mL single neck RB flask equipped with condenser, temperature probe, heating mantel and stirring bar/magnetic stirrer. Approximately 4 g of 4-nitrobenzoic acid (0.24 equiv.) and 0.02 g of N'n'dimethyl dodecylamine (catalyst) were then charged to the flask. reactants were brought to reflux (114° C.) with stirring and cooked for 8 hours. The product was a clear and slightly yellowish solution. The acid number was titrated with 0.087N KOH and found to be 0.25 indicating 99% conversion of the acid.

Acid # = 0.25
Theoretical wt. solids = 42.4
Observed wt. solids = 44.4

EXAMPLE 7

Addition of Phosphorous Pentoxide to an Epoxy Acrylic Block Copolymer

A 500 mL threeneck roundbottom flask was equipped with an anchor stirrer, reflux condenser and a thermometer. A solution of an epoxy block copolymer—MMA//GMA (88//12 wt%) in glyme was added (96.0 g solution, 44.7 g polymer, 51.3 g glyme; $M_n = 3260$, $D_p = 1.08$) followed by solid phosphorous pentoxide (4.6 g, ca. 1.0 eq. based on epoxy). On addition of the solid phosphorous pentoxide a distinct exotherm was observed and the solution became pale yellow. The mixture was allowed to stir at room temperature for about an hour. After precipitation from distilled water, the white solid was washed with additional. Acid Number: 51.5. A similar reaction conducted with about 0.75 equivalents of phosphorous pentoxide and stirred for 2-3 hours at room temperature afforded a white solid material that had an acid number of 56.7 after precipitation from hexane (distilled water wash).

EXAMPLE 8

Lab Preparation of an Amine Functional (Tertiary Amine) MMA Block Copolymer With Aliphatic 3° Amine Functionality A MMA//GMA 88//12 epoxy block copolymer theoretical $M_n = 4600$ and theoretical epoxy $D_p = 4.0$ was reacted with N'n'dimethyl 1,3 propane diamine to give pendant tertiary amine functionality. Approximately 150 g of the copolymer (70 g solids, 0.052 equiv. epoxy) and 50 g of diglyme were charged to a 300 mL round bottom flask equipped with stirring bar, heating mantel, condenser, temperature probe and dean-stark trap. After 60 g of solvent (glyme) was stripped, the batch temperature reached 130° C. at reflux. The batch was cooled to 80° C. at which time 4.7 g (0.047 equiv.) of N'n'dimethyl 1,3 propane diamine and 10 g N-butanol were charge to the flask. Batch temperature was elevated to 125° C. and held for 3 hours. Reacted product was clear and slightly amber in color.

EXAMPLE 9

Functional MMA Block Copolymer With Aromatic 1° Amine Functionality

The MMA//GMA 88//12 epoxy block copolymer of Example 8 was reacted with p-aminobenzoic acid to give pendant aromatic amine functionality. Approximately 156 g of the copolymer (72.5 g solids, 0.054 equiv. epoxy), 80 500 mL thick round bottom flask equipped with stirring bar, condenser, temperature probe, heating mantel and dean-stark trap. At 100° C. (reflux), solvent stripping (presumably glyme) was started via dean-stark trap until 53 g of solvent was removed (45 min). The temperature was held at 130° C. for 3½ hours. After cooling, the acid number (0.0893 NKOH) was titrated and found to be 3.2, indicating 90% conversion of the acid.

Production Description
Acid # = 3.2
Theoretical Wt. solids = 41.7
Observed solids = 43.5

Table I gives the elements of the solubility parameters for various solvents. The "P" entry is the polar parameter. Generally, dispersant of the invention performed better than control AB dispersants in the higher polarity solvents, but not as well in those with a polarity parameter less than 1.0.

TABLE I

| SOLVENT | 3-D SOLVENCY PARAMETERS | | |
|---|---|---|---|
| | NP | P | H |
| XYLENE | 8.7 | 0.5 | 1.5 |
| TOLUENE | 8.8 | 0.7 | 1.0 |
| MIBK | 7.5 | 3.0 | 2.0 |
| MEK | 7.8 | 4.4 | 2.5 |
| BUTYL ACETATE | 7.7 | 1.8 | 3.1 |
| ACETONE | 7.6 | 5.1 | 3.4 |

Table II shows the weight percent of various dispersants needed to disperse phthalocyanine blue pigment in a low polarity solvent, toluene, and in a relatively high polarity solvent, butyl acetate. The dispersants other than the control are made according to the invention with an MMA B-segment having a $D_p$ of 40. The A-segments are GMA blocks functionalized by reaction with p-nitrobenzoic acid to the indicated $D_p$.

TABLE II

| Wt % Dispersant Required to Deflocculate Pigment | | |
|---|---|---|
| $D_p$ of functionalized A-segment | Toluene | Butyl Acetate |
| Control A-B | 5-10 | 15-20 |
| 1.4 | 10-15 | >20 |
| 3.3 | 10-15 | 10-15 |
| 5.4 | 20-25 | 10 |
| 9.6 | >40 | 10 |

Miscellaneous Modifiers of MMA B-Segment Epoxy Block Copolymers

Acid-Base interactions between the dispersant A-segment and the pigment surface is a major factor in stabilizing pigments against flocculation. The neutral nitro group is probably the most versatile because; (A) it is highly polar and will adsorb on most pigment surfaces; (B) it is relatively inert toward unwanted side reactions.

However, there are some pigments with highly acidic or basic surfaces which probably can be more easily dispersed with a conjugate dispersant. For these reasons we have started to investigate acidic and basic modifications of acrylic epoxy block copolymers prepared by GTP.

Amine Modifiers

Aromatic Amines.—The reaction of p-aminobenzoic acid with epoxy block copolymers affords pendant aromatic amine functionality. The base catalyzed reaction between an epoxy group and p-aminobenzoic acid favors the epoxy/acid reaction. This preference is most likely due to the aromatic amine being protonate. This reaction can be conveniently monitored by either measuring residual acid or amine values. Typically 90% conversion of the acid is obtained after four hours of reaction in glyme/diglyme mixtures (130° C.). This reaction provides a viable alternative to ammoniation for obtaining amine functionality. Aromatic amines are basic and may act as more effective dispersants with acidic pigments than the neutral nitro dispersants. A concern associated with aromatic amines is their tendency to yellow on outdoor exposure. Aromatic amine functional block copolymers are effective pigment dispersants comparable to the nitro modified systems of similar structure.

Aliphatic Amines.—Another route to basic modifications of acrylic epoxy block copolymers is by reaction with various aliphatic amines. For example, a primary amine can be obtained through ammoniation; a secondary amine by reaction with methalamine; and a tertiary amine by reaction with N,N-dimethyl-1,3-propanediamine. The potential for further reaction (crosslinking) of pendant amine products can be suppressed in each case by using an excess of the appropriate amine. Each of the amine/epoxy reactions seem to run better in solvent mixtures containing alcohols.

Dispersants with pendant primary amine functionality gave poor dispersions across a range of solvents with differing polarity. Poor dispersion in non-polar solvents was probably the result of strong H-bonding causing aggregation of dispersant molecules. Poor dispersions observed in ketone solvents is probably due to reaction of the ketone carbonyl with the primary amine to form a poorly adsorbing imine group. Dispersants with secondary and tertiary amines provided good dispersion in non-polar and moderately polar solvents with pigment.

Other Modifiers 3,5 Dinitrobenzoic Acid.—Modification of acrylic epoxy block copolymers with 3,5-dinitrobenzoic acid affords ready access to relatively clean, well-defined block copolymers bearing segments of highly electron deficient aromatic rings. These types of polymers will probably interact strongly (forming charge-transfer complexes) with a wide variety of amine continuing materials. Polymers of this type may have biological applications or may be useful as pigment dispersants. Preliminary evaluation of their dispersant performance in four solvents using phthalocyanine blue pigment suggests that they are similar to 4-nitrobenzoic acid modified polymers (Table III).

The aromatic carboxylic acids useful in the invention include particularly
benzoic acid,
2-nitrobenzoic acid,
3-nitrobenzoic acid,
4-nitrobenzoic acid,
3,5-dinitrobenzoic acid,
1-naphthoic acid, and
3-chlorobenzoic acid,
the aliphatic carboxylic acids include particularly
glycolic acid
cyanoacetic acid
1,2-hydroxy dodecanedioc acid
1,2-nitro dodecanedioc acid, and
2,2-bis hydroxymethylpropionic acid,
and the anhydrous hydrohalogen acids include
hydrochloric acid,
hydrofluoric acid, and also
hydroiodic acid, and
hydrobromic acid.

Hydroxy.—Pendant epoxy groups can be easily converted to diols be ketalization followed by hydrolysis of the intermediate dioxolane. These hydroxy bearing block copolymers act as weakly adsorbing dispersants in non-polar media. Evaluation in four solvents with phthalocyanine blue pigment is presented in Table III. Phenols and thiophenols may also be useful.

We have also evaluated block copolymers bearing aromatic hydroxy groups as pigment dispersants. These polymers were prepared by the reaction of benzoic acid with the acrylic epoxy block copolymers. As indicated in Table III, these materials behave comparably to the aliphatic hydroxy block copolymers described above.

Ortho phosphoric Acid.—Hydrolysis of the intermediate obtained by reaction of epoxy acrylic block copolymers with either anhydrous (ortho) phosphoric acid or its equivalent phosphoric pentoxide provides an acidic class of dispersants. Anhydrous hydrochloric acid is also useful. Nitric or sulphuric acid may be useful if they are kept anhydrous. Preliminary evaluation of these materials (Table III) suggests that they are reasonable dispersants. These dispersants may be particularly useful with inorganic pigments and may find application in the magnetic tape industry.

TABLE III

| Evaluation of Miscellaneous Modifiers of MMA/GMA Epoxy Block Copolymers | | | |
| --- | --- | --- | --- |
| Solvent | 3-5-Dinitro | Dihydroxy | Phosphorus Pentoxide |
| Xylene | 3 | 1 | 1 |
| Toluene | 1 | 1 | 1 |
| MIBK | 1 | 3 | 1 |
| Acetone | 3 | 3 | 3 |

Industrial Applicability

In addition to the uses of AB dispersants of the invention in coatings and molding resins, such polymers have many other potential uses, as do other products made by group transfer polymerization. These can include cast, blown, spun or sprayed applications in fiber, film, sheet, composite materials, multilayer coatings, photopolymerizable materials, photoresists, surface active agents including soil repellants and physiologically active surfaces, adhesives, adhesion promoters and coupling agents, among others. End products taking advantage of available characteristics can include lacquers, enamels, electrocoat finishes, high solids finishes, aqueous or solvent based finishes, clear or filled acrylic sheet or castings, including automotive and architectural glazing and illumination housings and refractors, additives for oil and fuel, including antimisting agents, outdoor and indoor graphics including signs and billboards and traffic control devices, reprographic products, and many others.

What is claimed is:

1. A composition suitable for use as a dispersant having an A segment and a B segment bonded together to form a block copolymer, the A segment consisting essentially of polymerized methacrylic monomer units and the B segment consisting essentially of polymerized monomer units selected from the group consisting of acrylic and methacrylic groups, the monomer units of said A segment, when homopolymerized, having a polarity which is higher than the polarity of the monomer units of said B segment when homopolymerized, said A segment being bonded to one or more polar groups selected from the group consisting of aromatic carboxylic acids, aliphatic carboxylic acids which have at least one functional group which increases the polarity of the reaction product of the A segment with the aliphatic carboxylic acid, ammonia and primary, secondary and tertiary aliphatic amines, primary aromatic amines, ketones which are subsequently hydrolyzed to diols, orthophosphoric acid, phosphorus pentoxide, and anhydrous hydrohalogen acid, wherein said block copolymer is made by group transfer polymerization techniques at 0° C. or higher.

2. The composition of claim 1 wherein the B segment consists essentially of at least 10 monomer units of alkyl methacrylate and the A segment consists essentially of at least 3 monomer units of epoxy-containing methacrylate and may also contain additional alkyl methacrylate monomer units.

3. The composition of claim 2 wherein the B segment has at least 20 monomer units and the A segment has from 4 to 16 monomer units.

4. The composition of claim 3 wherein the B segment consists essentially of about 40 monomer units of methyl methacrylate and the A segment consists essentially of about 12 monomer units of glycidyl methacrylate.

5. The composition of claim 1 wherein the B segment comprises monomer units selected from one or more of methyl methacrylate, butyl methacrylate, ethyl hexyl methacrylate, and lauryl methacrylate, and the A segment comprises monomer units of glycidyl methacrylate.

6. The composition of claim 1 wherein the aromatic carboxylic acids are selected from the group consisting of benzoic acid 2-nitrobenzoic acid, 3-nitrobenzoic acid, 4-nitrobenzoic acid, 3,5-dinitrobenzoic acid, 1-naphthoic acid, and 3-chlorobenzoic acid, and the aliphatic carboxylic acids are selected from the group consisting of glycolic acid cyanoacetic acid 1,2-hydroxy dodecanedioc acid 1,2-nitro dodecanedioc acid, and 2,2-bis hydroxymethylpropionic acid, and the anhydrous hydrohalogen acids are selected from hydrochloric acid and hydrofluoric acid.

7. The composition of claim 1 wherein the polar group bonded to the A segment is 4-nitrobenzoic acid.

8. The composition of claim 7 wherein the block copolymer consists essentially of methyl methacrylate and glycidyl methacrylate monomer units and the polar group bonded to the A segment is 4-nitrobenzoic acid.

9. A solution of the composition of claim 1 dissolved in a solvent having a polar solubility coefficient greater than 1.0.

10. A pigment dispersion in organic solvent dispersed by means of a composition of claim 1.

11. A coating composition comprising a pigment dispersion of claim 10, a film former and a liquid media.

12. A molding composition comprising a pigment dispersion of claim 10 and a resin.

* * * * *